Dec. 27, 1938.  J. M. CUNNINGHAM  2,141,597

DECIMAL POINT CONTROL FOR ACCOUNTING MACHINES

Filed April 28, 1934   8 Sheets-Sheet 1

INVENTOR.
James M. Cunningham
BY Cooper, Kerr + Dunham
ATTORNEYS.

Dec. 27, 1938.                J. M. CUNNINGHAM                    2,141,597
                   DECIMAL POINT CONTROL FOR ACCOUNTING MACHINES
                            Filed April 28, 1934          8 Sheets-Sheet 2

FIG. 3.

|  | MC | MP | LH | X |
|---|---|---|---|---|
| 9.0 ×968=8712. | 968 | 9 | 8712 | NO |
| .09 ×968= 87.12 | 968 | 9 | 8712 | 1 |
| .009×968= 8.712 | 968 | 9 | 8712 | 1 |

INVENTOR.
James M. Cunningham
BY
Cooper, Kerr & Dunham
ATTORNEYS.

Dec. 27, 1938.  J. M. CUNNINGHAM  2,141,597

DECIMAL POINT CONTROL FOR ACCOUNTING MACHINES

Filed April 28, 1934  8 Sheets-Sheet 5

FIG.4c.

INVENTOR.
James M. Cunningham
BY Cooper, Kerr & Dunham
ATTORNEYS.

Dec. 27, 1938.   J. M. CUNNINGHAM   2,141,597
DECIMAL POINT CONTROL FOR ACCOUNTING MACHINES
Filed April 28, 1934   8 Sheets-Sheet 6

FIG. 4d.

INVENTOR.
James M. Cunningham
BY Cooper, Kerr & Dunham
ATTORNEYS.

Dec. 27, 1938.   J. M. CUNNINGHAM   2,141,597
DECIMAL POINT CONTROL FOR ACCOUNTING MACHINES
Filed April 28, 1934   8 Sheets-Sheet 7

Patented Dec. 27, 1938

2,141,597

UNITED STATES PATENT OFFICE

2,141,597

DECIMAL POINT CONTROL FOR ACCOUNTING MACHINES

James M. Cunningham, Endicott, N. Y., assignor to International Business Machines Corporation, New York, N. Y., a corporation of New York Application April 28, 1934, Serial No. 722,860

4 Claims. (Cl. 235—61.6)

This invention relates to improvements in accounting machines and more particularly to improvements in automatic decimal point selecting devices for multiplying and other accounting machines.

In accounting operations multiplying computations frequently involve decimals. For example, a series of computations may comprise:

$$968 \times 9.0$$
$$968 \times .09$$
$$968 \times .009$$

In the first computation set forth above, the multiplier is a whole number representing a price per unit quantity, whereas in the second computation a decimal factor has been introduced which makes the multiplier digit represent a price per 100 units, and in the third computation a decimal factor has been introduced in the multipler which makes the multiplier digit represent a price per 1000 units. The three computed products represent cost amounts. The second multiplier differs from the first multiplier by a decimal factor of 1/100, and the third multiplier differs from the first multiplier by a decimal factor of 1/1000. The decimal factors or values are automatically taken account of and introduced during entry of a factor or factors into entry receiving devices.

In computing all of the foregoing, the actual act of multiplying involves only the various digits, taking into account their denominational value, and multiplication is effected in the same manner, irrespective of the location of the decimal point. That is to say, $968 \times .09$ would be computed in the same manner as the multiplication of $968 \times 9.0$. However, the position of the decimal point in the multiplier as determined by the decimal value thereof determines and effects the location of the product with respect to a fixed decimal point location in the product receiving device.

In handling computations of the foregoing class it is frequently desirable to provide a special characteristic on the controlling card or record to indicate the decimal value of the multiplier factor. For example, with the foregoing typical computations, the record for the multiplier 9.0 could be a regular card without any special characteristic perforation and the record having a multiplier factor pertaining to a hundred units could have a special characteristic perforation on the record, say at the first extra or eleventh index point position. So also, the record with a multiplier factor pertaining to a thousand units could have a special characteristic perforation on the record, say at an extra index point position in a different column.

The present invention is directed to the provision of means whereby a multiplying machine may be capable of automatically selectively entering into the machine the multiplicand and the multiplier of a multiplying computation and in so doing introduce into at least one of these factors a decimal factor or value as determined by a special characteristic perforation on each record.

A further object of the present invention resides in the provision of an accounting machine with means for automatically controlling entries thereinto and for taking into account the decimal value relation which may vary from item to item.

A further object of the present invention resides in the provision of means for automatically shifting the control of item entry denominationally.

A further object of the present invention resides in the provision of an accounting machine which automatically takes into account the classification of items into different classes in accordance with their decimal value relation.

A further object of the present invention resides in the provision of means for automatically superimposing a decimal factor or value upon an item entered into an item receiving device of the machine.

A further object of the present invention resides in the provision of a multiplying accounting machine having means to maintain a determined decimal point relation in the products receiving means upon successive entries of products thereinto which are based upon factors whose decimal value characteristics may vary and which include the means to take into account the decimal value characteristics of a factor and to control the entry into the factor receiving means in accordance with said decimal value characteristics.

A further object of the present invention resides in the provision of an accounting machine with means for automatically introducing a decimal factor or value with an entry thereinto.

A further object of the present invention resides in the provision of a multiplying accounting machine with decimal point control adapted for rate card operation.

A further object of the present invention resides in the provision of a multiplying accounting machine with a decimal value control and adapted for summarizing products.

Further and other objects of the present invention will be hereinafter set forth in the accompanying specification and claims and shown in the drawings which show by way of illustration a preferred embodiment and the principle thereof and what I now consider to be the best mode in which I have contemplated applying that principle. Other embodiments of the invention employing the same or equivalent principle may be used and structural changes made as desired by those skilled in the art without departing from the present invention and within the spirit of the appended claims.

The multiplying accounting machine to which the present invention is shown applied, so far as various units in the manner of drive is concerned, is substantially the same as the machine shown and described in the United States patents to Cunningham No. 1,933,714 and Oldenboom No. 1,944,655 to which reference may be had for a fuller description of the general operation of the various units and the manner of drive.

In lieu of providing a non-creeping drive for the contact roll 87, a creeping drive is provided of the type shown and described in the United States application of George F. Daly, Serial No. 643,663, filed November 21, 1932. To provide the creeping drive, supplemental gearing 81a, 81b, 81c and 81d (Fig. 1a) are provided for driving the contact roll 87 with a creeping movement. Such creeping drive for the contact roll is also shown and described in the above mentioned Oldenboom patent.

Figure 1:
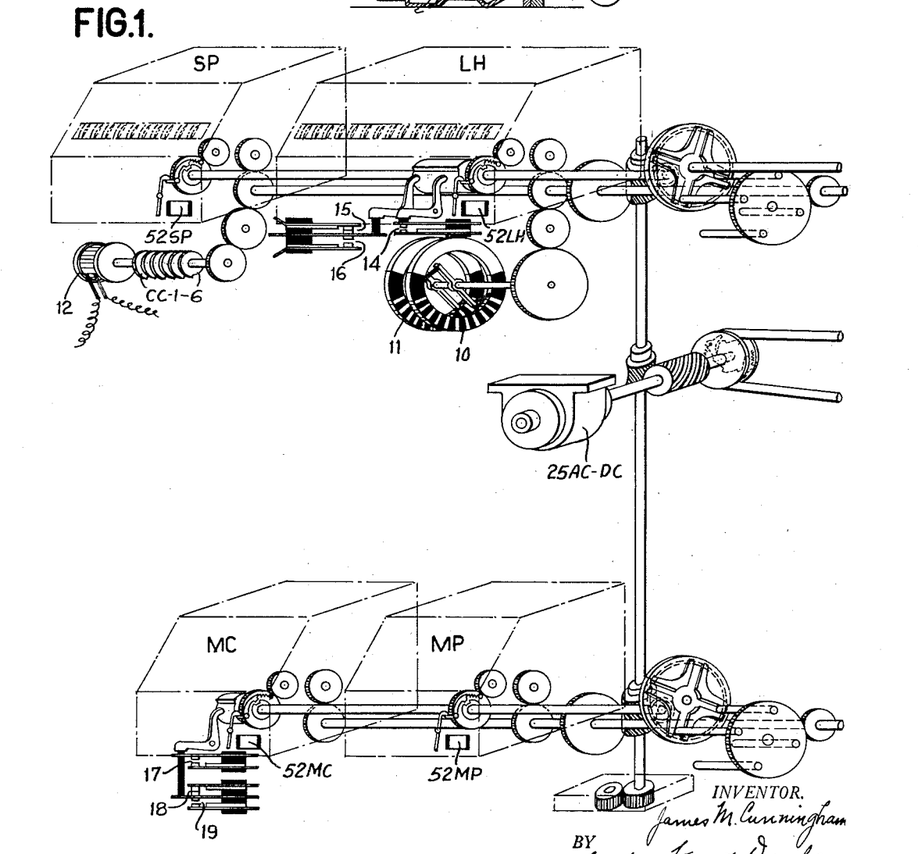
Figures 1 and 1a taken together, show somewhat diagrammatically the driving mechanism of the machine and the various sections thereof.

The machine includes an entry receiving device for the multiplier shown at MP on Fig. 1. There is also an entry receiving device MC for the multiplicand. Also shown on Fig. 1 are the LH accumulator designated LH and a summary products accumulator designated SP. On Fig. 1a there is shown the RH accumulator. These various accumulators are driven in the same manner as correspondingly located accumulators in the Cunningham patent above referred to and there is a reset drive generally similar to the reset drive shown in the Cunningham patent.

Figure 1A:
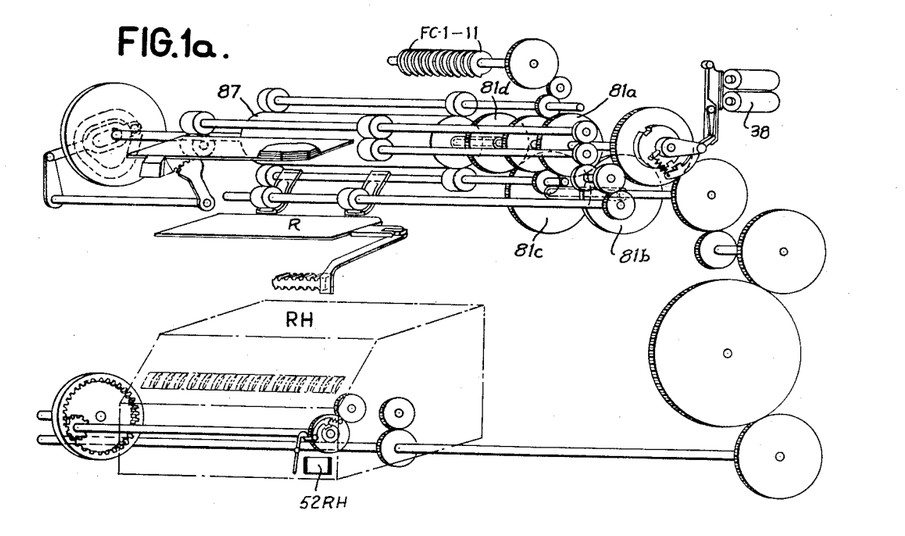

The machine also includes a column shift and control relay section designated CS and CR (Fig. 1a) and there is also a multiplier plate relay section MPR (Fig. 1a). The machine includes two impulse emitters 10 and 11 (Fig. 1) and an impulse distributor 12 (Fig. 1). Cam contacts CC—1 to 6 are provided which are driven from the counter drive shaft in the indicated manner. The LH accumulator reset devices control two sets of contacts, one comprises a single contact pair 14 which is adapted to be closed upon reset and the other being a three-blade contact arrangement involving two pairs of contacts 15 and 16. Contacts 15 open upon reset and contacts 16 close upon reset. The MC accumulator resetting device controls two sets of contacts as shown in Fig. 1. One set of contacts comprises a single contact pair 17 which close upon reset. A three-blade contact assembly including contact pairs 18 and 19 is so arranged that contacts 18 open upon reset and 19 close upon reset.

Figure 2:
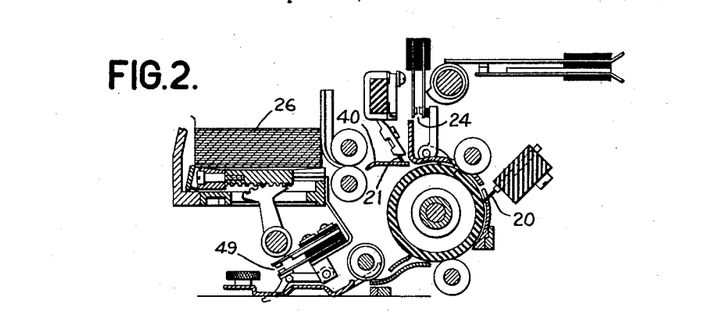
Fig. 2 is a cross-sectional view of the card feed, card handling and sensing section of the machine.

Referring now to Fig. 2, in general the card handling and sensing section of the machine is generally the same as in the Cunningham patent. The readout or sensing brushes are shown at 20 (Fig. 2). In lieu of the single X brush designated 106 in the Cunningham patent, there are three extra advance brushes, one of which is shown at 21 in Fig. 2. The other extra brushes are designated 22 and 23 on the circuit diagram (see Fig. 4d) and such brushes are not visible in Fig. 2, inasmuch as the same are disposed directly in the rear of the brush 21. These brushes can be manually shifted along their support from column to column. The machine also includes card lever contacts 24. Complete details of the punch are not herein shown as they are substantially the same as the punch described in the Cunningham and Oldenboom patents. A fragment of the punch is shown in Fig. 1a in proximity to the card R in the entering section of the punch.

The machine includes a driving motor M, an A. C.-D. C. generator 25 on Figs. 1 and 1a respectively.

In the card handling section of the machine there are cam contacts FC—1 to 11 driven in the manner indicated in Fig 1a.

*General operation*

Before describing the circuit diagram of the machine the general mode of operation of the machine will be briefly explained.

The various cards are perforated in the customary manner for the multiplicand factor. The other factor is, however, so perforated upon the records that different decimal values of such factor are delineated in a common column. For example, with a multiplier amount of 9 on one card, a multiplier amount of .09 on another card, and a multiplier amount of .009 on still another card of a run, the nine (9) would be perforated in the same column on all of the cards. To differentiate the cards according to different decimal characteristics of such factor, the denominational magnitude characteristics of such factor will be shown on some cards by a special perforation related thereto.

Figure 3:
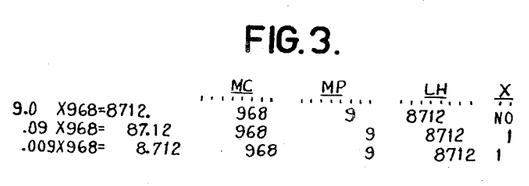
Fig. 3 shows illustrative computations as performed by the machine and the manner of entry of items and the taking into account of the decimal factors.

It may be explained that the present machine is adapted to handle regular multiplying operations which do not involve any decimal value control. In such case the full capacity of the machine may be utilized, viz., eight columns for the multiplier and eight for the multiplicand. When handling computations involving decimal control the columnar capacity is changed in the following manner. Six columns are available for entry of the multiplier and seven columns are available for entry of the multiplicand. If the machine is operating with decimal value control for a multiplier which involves no decimals the card will have no characteristic extra perforation upon it (see line 1 of Fig. 3). On the other hand, if the machine is multiplying with a multiplier factor pertaining to a hundred units, for example with a multiplier of .09, the card will be punched with a special perforation in a selected column in the eleventh or X extra index point position. Such special perforation will thereupon divert the entry of the multiplier relatively two columns to the right in the multiplier entry device. Thus a decimal factor or value of one one-hundredth will be automatically introduced. This is shown in line 2 of Fig. 3. On the other hand if the machine is to handle a computation involving a multiplier factor pertaining to a thousand units, there will be another extra perforation in the record in the eleventh or X extra index point positions in a different column. Thus a decimal factor or value of one one-thousandth will be automatically introduced. This second perforation will relatively shift the entry of the multiplier factor two columns to the right and will also relatively shift the entry of the multiplicand factor one column to the right as indicated in line 3 of Fig. 3. The machine then effects computation in the usual manner and by the selective entry of the multiplier and/or multiplicand the decimal value will be taken into account in effecting the computation. The effect of making the relative shift of an entry or entries into the MP and MC receiving device is to relatively shift the position of the product as it is entered into the LH and RH accumulators with respect to a fixed decimal point location therein. Accordingly, upon completion of the computation and the gathering together of the complete product in one accumulator, such product will be in proper position and the decimal component in each computation will be taken into account and will be in the same place in the products receiving device. Inasmuch as the product will appear in a variable relation in the product accumulator, such product when it is recorded back on the record card will be in a relatively shiftable relation with respect to the decimal point location upon the record.

The machine herein shown is adapted to perform multiplying operations involving rate cards either with or without decimal value control and it is also adapted to perform summary product accumulations with or without decimal value control. It is furthermore adapted to perform checking operations either with or without decimal value control.

*Circuit diagram*

Figure 4A:
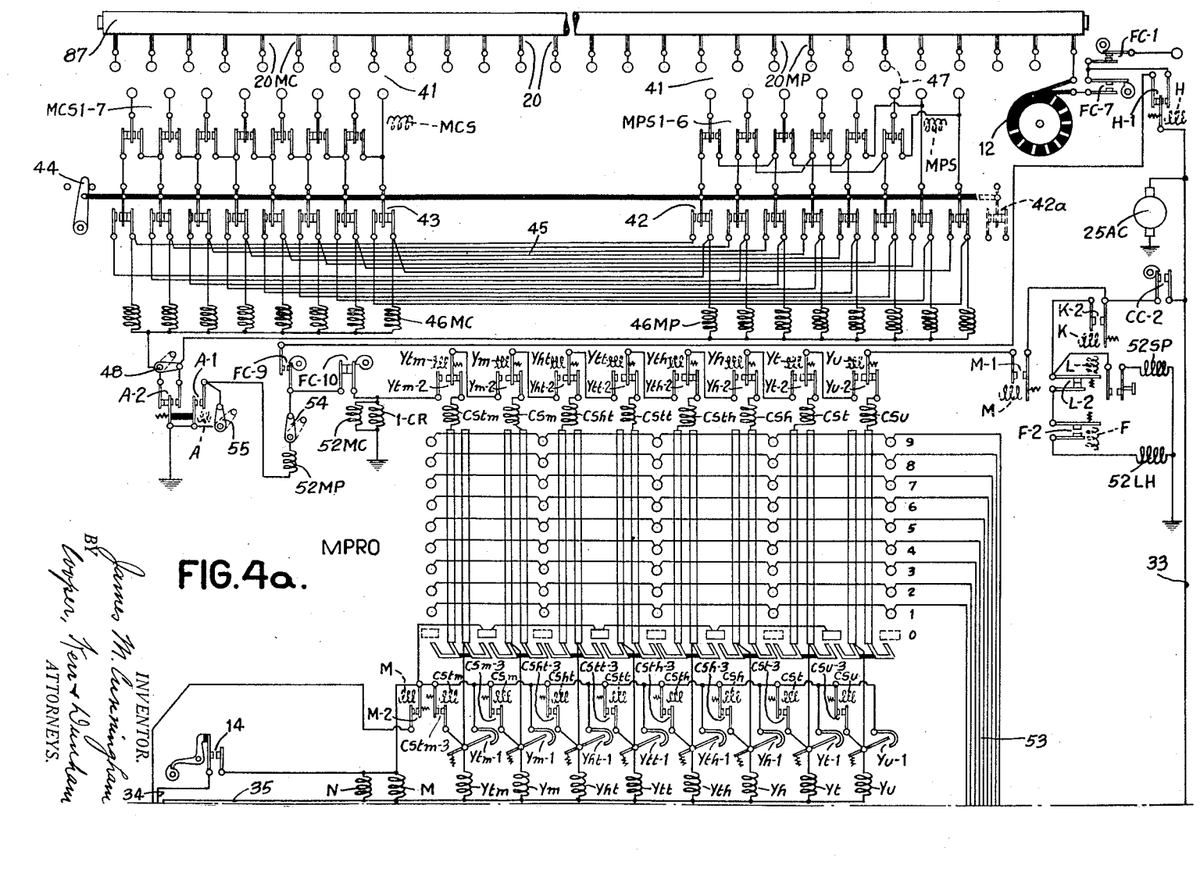
Figs. 4a, 4b, 4c and 4d, taken together and arranged vertically in the order named, show the circuit diagram of the machine.
Figure 4B:
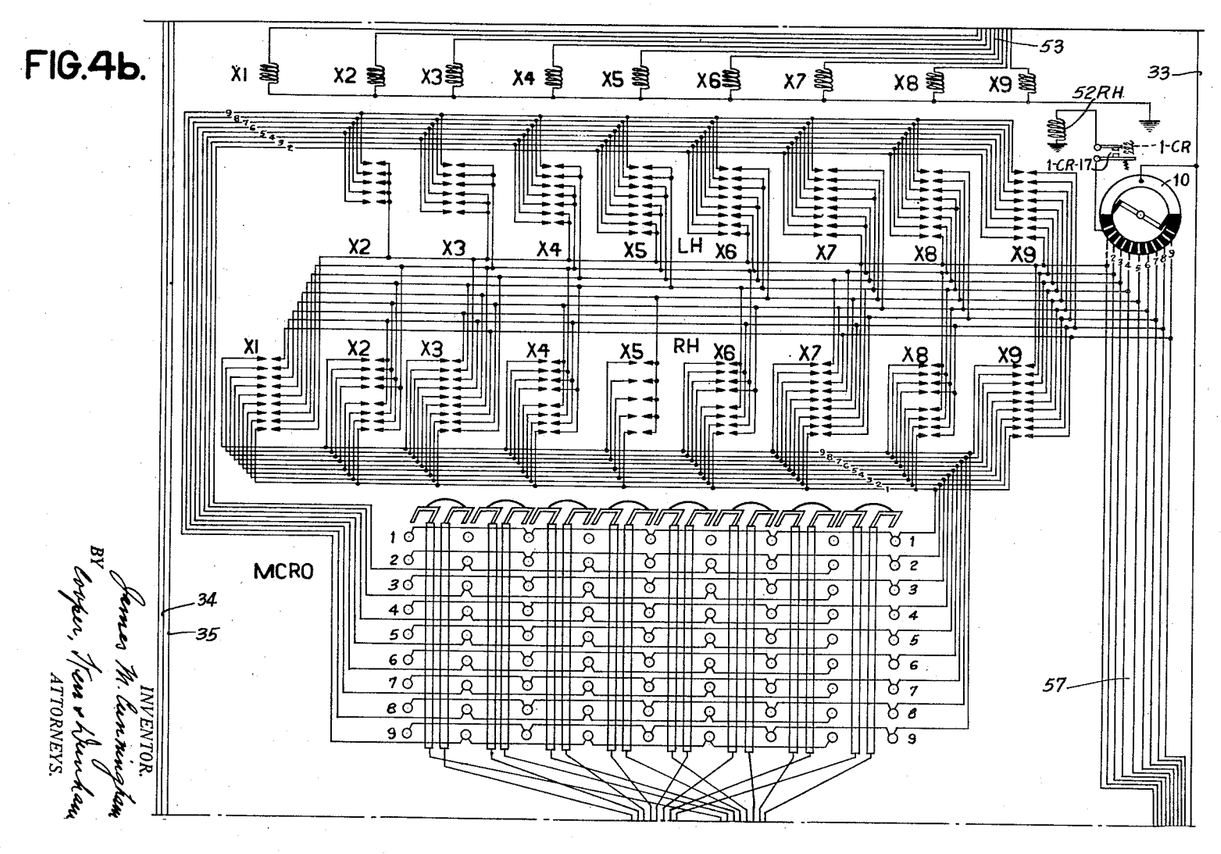
Figure 4C:
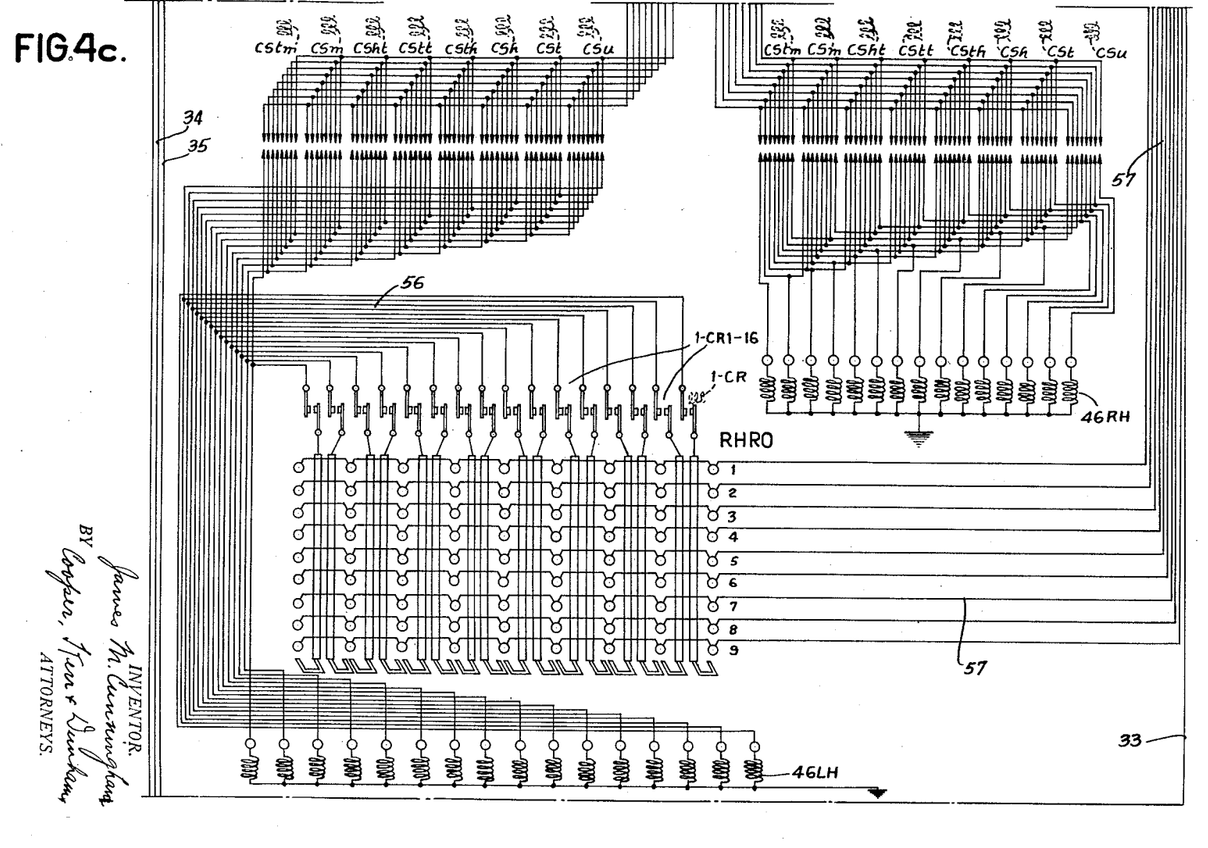
Figure 4D:
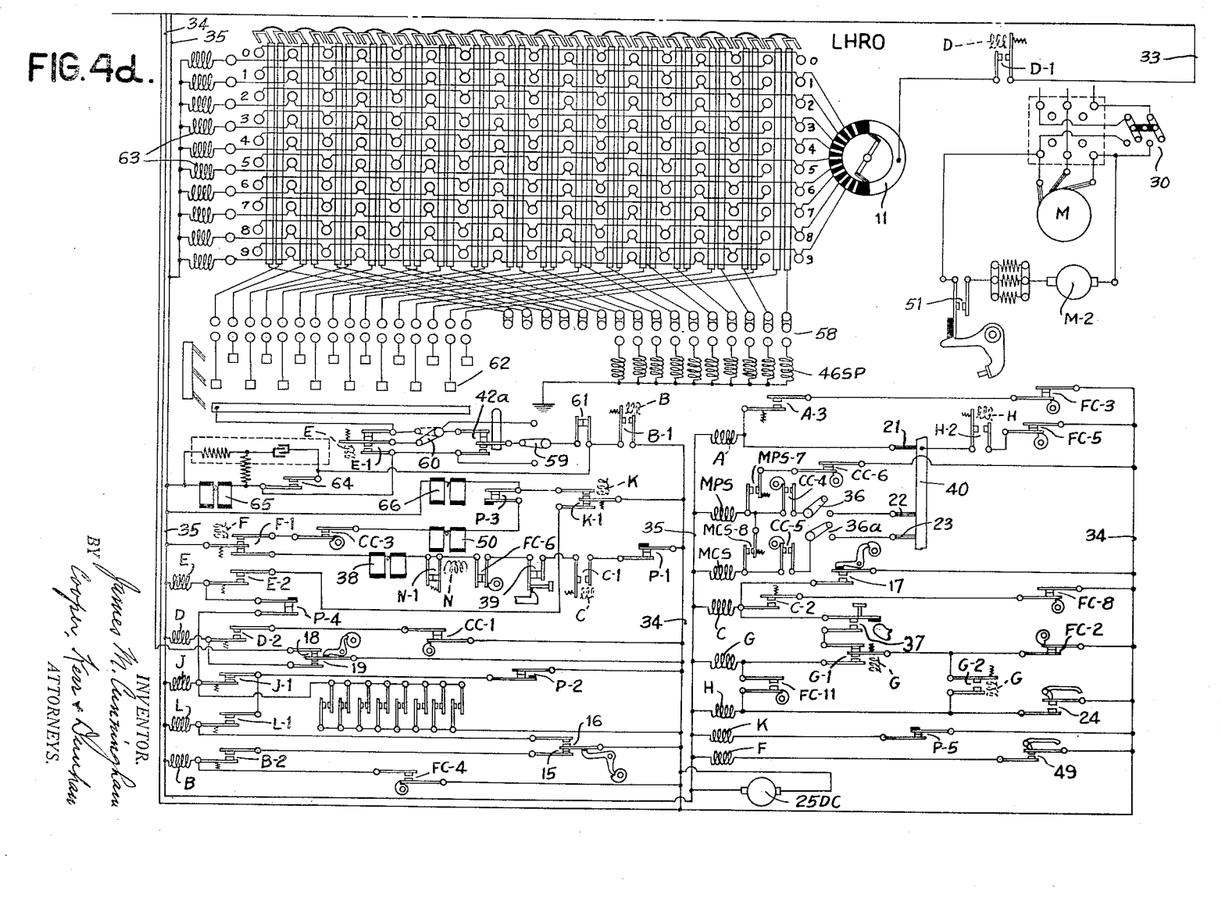

It will be assumed that properly perforated cards are in the supply magazine 26 of the card handling section of the machine (see Fig. 2). To start the machine in operation the switch 30 (Fig. 4d) is first closed to supply current for the main driving motor M and for the punch driving motor M—2. Rotation of the main driving motor M puts into operation the A. C.-D. C. generator 25 (Figs. 1, 4a and 4d). The A. C. end of the generator supplies current to bus 33 and to ground (Fig. 4a) and the D. C. end of the generator supplies current to buses 34 and 35 (Fig. 4d). Before closing the start key, the operator throws switches 36 and 36a (Fig. 4d) to closed position, i. e. opposite to the position shown. Such switches are thrown to closed position when decimal point controlling operations are to be effected. When the machine is to be used without any decimal value control, these switches are thrown to open position. The start key is now depressed to close start key contacts 37 (Fig. 4d) and to complete a circuit from the 35 side of the D. C. line through relay coil C, contacts G—1 now closed, cam contacts FC—2 to the 34 side of the D. C. line. A stick circuit is established through the relay contacts C—2 of relay coil C and cam contacts FC—8 now closed. Energization of relay coil C also closes relay contacts C—1 establishing a circuit from the 35 side of the D. C. line through relay contacts F—1, through card feed clutch magnet 38 (see also Fig. 1a), through relay contacts N—1 now closed, through cam contacts FC—6 now closed, through stop key contacts 39 now closed, through relay contacts C—1 now closed, through the punch control contacts P—1 now closed and back to line 34. As in previous machines, the start key must be kept depressed for the first four counter cycles in starting up a card run or alternatively, it may be depressed and released and again depressed. Starting operations are prevented until the feed rack of the punch is in proper right hand position. This is provided for by punch contacts P—1.

The first complete card feed cycle on starting up the machine will advance the first card to a point where the X brushes 21, 22 and 23 will be in alignment with the first extra index point position of the card or the eleventh index point position. It will be assumed that the card which is sensed has a single extra index point perforation therein at the eleventh position in a particular column, signifying that the multiplier pertains to a hundred units. In such case the extra index point perforation will be under the brush 22 (Fig. 4d). The card will also cause closure of card lever contacts 24 (Figs. 2 and 4d) and closure of such contacts 24 will cause energization of relay coil H. With relay coil H energized, the relay contacts H—2 will be closed. Accordingly with brush 22 over the special perforation in the card a circuit will be completed from the 35 side of the D. C. line, through a special relay coil MPS, through cam contacts CC—4, which will now be closed, through switch 36 in closed position, through the brush 22 to the common contact bar 40, through relay contacts H—2, through cam contacts FC—5 which will now be closed, to the 34 side of the D. C. line. The energization of MPS closes contacts MPS—7 (Fig. 4d) to complete a stick circuit for MPS back through cam contacts CC—6. The energization of MPS also shifts the three-blade multi-contact points MPS—1 to 6 (Fig. 4a) to reverse position from that shown. The card at this time is about to be read by the regular brushes 20. As the second card feed cycle ensues, the card is carried past the brushes 20 and amounts are entered into the multiplicand and multiplier counters.

The entry circuits will now be traced. Current flows from the A. C. line 33 (Fig. 4a), through relay contacts H—1 now shifted, through cam contacts FC—7, through the impulse distributor 12, to card transfer and contact roll 87, thence through the brushes 20 pertaining to the multiplier, these being designated 20MP on Fig. 4a, through the brushes 20MC pertaining to the multiplicand and to the plug sockets at plug board 41. The customary plug connections are provided at this plug board for directing the entry of the multiplier and multiplicand into their respective receiving devices. The center blades of the MPS—1 to 6 contacts are wired to certain of the plug sockets of plug board 41, which are provided for the multiplier entry. Supplemental three-blade checking contacts 42 and 43 are provided which are in the position shown for normal multiplying operations and which may be manually shifted by the member 44 to reverse position for checking operations. The function of such three-blade switches for checking purposes is to reverse the entries of the multiplier and multiplicand causing the multiplier to become the multiplicand and the multiplicand to become the multiplier. The cross-wiring generally designated 45 and the three-blade contacts 43, 42 provide for such reversal.

The wiring intermediate the contacts 42 and the three-blade contacts MPS—1 to 6 is such that with relay coil MPS de-energized, there will be a straight entry of the multiplier into the MP entry device, the counter magnets of which are designated 46MP. On the other hand with relay coil MPS energized as it is in the computation now under consideration, the entries will be directed relatively two columns to the right in the MP entry device with respect to their normal entry relation. This will be understood by tracing the circuit through a single plug connection in the multiplier field. Assume such plug connection shown by dotted lines at 47. Normally and without MPS energized, the entry would be made in the third order from the extreme right, the hundreds order 46MP magnet being energized. However, if MPS is energized, the circuit will extend through the shifted MPS—6 contact to the units order 46MP counter magnet. It may be here explained, that a generally similar arrangement is provided for the multiplicand field, except in this case the wiring is such that in place of shifting the entries two columns relatively to the right when the relay magnet is energized, the shift is made one column relatively to the right upon the energization of MCS.

For operations which do not involve rate card control, switch 48 (Fig. 4a) is thrown to the closed position. The ground return circuit from the 46MC counter magnets is through the closed relay contacts C—2. The return circuit from the 46MP counter magnets is via switch 48 and through relay contacts A—2. The contacts A—2 will be reversely shifted by the energization of relay coil A (Fig. 4d), but during entry of the multiplier and multiplicand on regular multiplying operations coil A is de-energized.

After manual initiation of operations on the first cards, subsequent card feed operations are initiated automatically by the reset of the multiplicand counter. At the beginning of the second card feed cycle, the closure of cam contacts FC—11 (Fig. 4d) will cause relay coil G to become energized. Current flows from 35, through G, through FC—11, through card lever contacts 24 to line 34. The energization of G shifts contacts G—1 to reverse position interrupting the circuit to the start key contacts 37, but maintaining the circuit to cam contacts FC—2. The energization of G also closes relay contacts G—2 and establishes a stick circuit for coils G and H, either through the FC—2 contacts or the card lever contacts 24.

The card is fed through the card handling section of the machine and ultimately it passes to the R position in the punch, closing card lever contacts 49 (see Figs. 1a, 2 and 4d), energizing relay coil F and causing relay contacts F—1 to shift. With the punch contacts P—5 closed, relay coil K will be energized and contacts K—1 shifted. Upon the shifting of contacts F—1 and upon closure of cam contacts CC—3, a circuit will be established to the punch clutch magnet 50. This circuit is completed to the other side of the line, through the punch contacts P—3 now closed and contacts K—1 which are in shifted position. The energization of punch clutch magnet 50 will cause closure of contacts 51, which become latched closed. Accordingly current supply is provided for the punch driving motor M—2. The card which had been previously read and which is now in the punching unit in the R position is now advanced endwise to a position at which punching is to commence.

According to the present invention the actual multiplying operation and setup of the cycle controller is initiated upon the reset of the LH accumulator. LH reset is initiated as follows. Energization of relay coils F and K has caused relay contacts F—2 and K—2 (Fig. 4a) to close. Upon closure of cam contacts CC—2 current flows from the 33 line through CC—2, through contacts K—2, through closed relay contacts L—2, through contacts F—2, to the 52LH reset magnet and back to ground. Energization of 52LH brings about reset of the LH accumulator. During the reset of the LH accumulator, the reset contacts 16 (Figs. 1 and 4d) close and cause relay coil L to be energized, opening relay contacts L—2 (Fig. 4a) to prevent repetition of LH reset.

The machine is now ready to set up the cycle controller and carry out actual multiplying. Upon LH reset, reset contacts 14 close to establish a circuit through relay coils M and N (Fig. 4a). Energization of relay coil M will close relay contacts M—1 and M—2. M—2 establishes a stick circuit for the relay coils M and N through the now closed multiplicand reset contacts 18 (Fig. 4d).

The cycle controller and column skipping arrangement is substantially the same as that shown in Fig. 15a in the Cunningham patent and is controlled from the MPRO readout in the same manner as in the Cunningham patent. With the cycle controller set up upon the energization of relay coil M, contacts M—1 close and following the set up of the cycle controller cam contacts CC—2 (Fig. 4a) close. Current then flows from the 33 A. C. line, through cam contacts CC—2, relay contacts M—1, through the Y—2 set of transfer contacts in the position shown, down through the CSu relay magnet and out through the brush which is standing say on the 9 spot of the readout in the units order, down through the 9 line of the group of wires 53 to the X—9 multiplying relay magnet (Fig. 4b) and to ground. Energization of X—9 controls the multiplying operations and the energization of the CSu relay directs the entry into the proper columnar orders of the LH and RH registers.

The manner of effecting multiplication need not be traced in detail since it is substantially the same as that in the aforementioned Cunningham patent. Upon completion of multiplying, all of the Y—2 set of transfer contacts (Fig. 4a) will have been shifted to reverse position and upon closure of cam contacts CC—2 there is a circuit path from the 33 side of the A. C. line, through CC—2, through relay contacts M—1 now closed, through all of the Y—2 set of transfer contacts to the 1—CR relay magnet and to the 52MC reset magnet. A branch circuit also extends through cam contacts FC—10 through a switch 54, through the 52MP reset magnet, through a switch 55 and back to ground. Energization of 52MP and 52MC causes reset of the MP and MC accumulators.

After the multiplying computation is complete for a given problem the amount standing in the RH accumulator is transferred over to the LH accumulator. This operation is brought about upon energization of the relay coil 1—CR which was energized in the manner previously explained. The energization of 1—CR causes closure of contacts 1—CR—1 to 16 (Fig. 4c) and 1—CR—17 (Fig. 4b). Closure of the 1—CR—1 to 16 contacts connects the RHRO readout (Fig. 4c) with the 56 transfer lines so that upon operation of emitter 10 impulses are emitted through a group of lines 57, through the RHRO readout, through the 1—CR—1 to 16 contacts to the LH accumulator magnets 46LH. Accordingly, the amount standing on the RH accumulator is entered into the LH accumulator in proper columnar relation therein. At the completion of emission of impulses by emitter 10, the emitter brush on encountering the extra spot supplies current through the contacts 1—CR—17 (Fig. 4b) now closed to RH reset magnet 52RH to cause the reset of this accumulator. It may be explained that the reset of the MP and MC counters occurs concurrently with the LH to RH transfer. The reset of the MC counter will cause the opening of contacts 18 (Fig. 4d) and break the stick circuit for relay coils M and N and open the circuit for all of the Y magnets thus preparing the cycle controller for a new entry from the following card.

The reset of the MC counter effects closure of reset contacts 17 which causes energization of relay coil C (Fig. 4d) and the closure of reset contacts 19 energizes relay coil D. When relay coil C is energized, relay contacts C—1 close and there is a re-energization of the card feed clutch magnet 38 through a circuit which has been previously traced.

Before or upon punching of the product amount back upon the record card there is transfer over of the product from the LH accumulator into the summary products counter. This is brought about in the following manner. Energization of relay coil D (Fig. 4d) causes closure of relay contacts D—2 establishing a stick circuit for relay coil D and through cam contacts CC—1. Energization of relay coil D also closes relay contacts D—1 and provides current supply from A. C. line 33 for emitter 11. Emitter 11 emits impulses through one section of the LHRO readout and through plug connections at plug board 58 to the SP counter magnets designated 46SP. Since the products appear in the LH accumulator in proper decimal point relation with respect to a fixed decimal point location, they will accordingly be transferred to the SP accumulator in proper decimal point relation. They will also be properly transferred to the record cards.

The machine is now ready to punch back the product on the record card, which operation is initiated in the following manner.

Early in the re-initiation of the card feed cycle cam contacts FC—4 (Fig. 4d) close, energizing relay coil B, causing the stick relay contacts B—2 to provide a stick circuit for relay coil B, through the LH reset contacts 15 now closed. The energization of relay coil B also closes relay contacts B—1. Assuming switches 59 and 60 (Fig. 4d) in the position shown, current will flow from the line 34, through relay contacts B—1 now closed, through the punch escapement contacts 61, through the switch 59, through supplemental contacts 42a (Figs. 4a and 4d) now in the position shown, through the switch 60, through relay contacts E—1 now in the position shown to the readout strip 62 (Fig. 4d). With current thus supplied to the readout strip and with the brush standing on the first of the spots at which punching is to commence, the punching operation will start, there being a readout through a related section of the LHRO readout and an energization of punch selector magnets 63. The closure of relay contacts B—1 (Fig. 4d) also supplies current to contacts 64 in the punch which contacts are closed by interposer action to supply current to the punch operating magnet 65. Punching now proceeds and will continue until the complete product is read out and punched. When punching is completed, contacts P—5 close, energizing relay coil K shifting relay contacts K—1 to establish a circuit to the eject magnet 66. The punched card will then be ejected from the punch. A new multiplying operation will then be initiated upon the succeeding record card. Such succeeding operation is initiated by the closure of relay contacts K—2 and F—2 (Fig. 4a) and by the reset of the LH accumulator as hereinbefore described. It may be explained that upon LH reset contacts 15 open to break the stick circuit for relay coil B and cause relay contacts B—1 to open the circuit to the punch operating magnet 65 and to cut off the circuits to the readout strip 62 of the punch.

Figure 5:
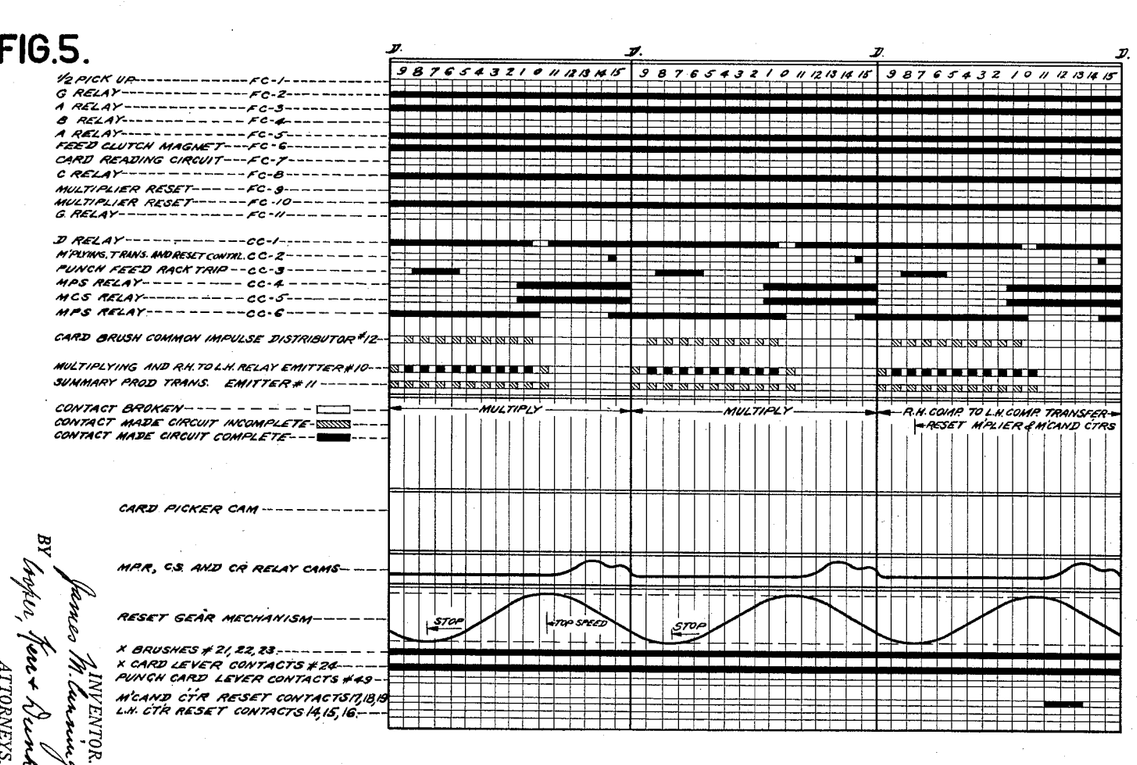
Figs. 5 and 5a taken together and arranged side by side with Fig. 5a to the right of Fig. 5, show the timing diagram of the machine.

It will be understood that if there is to be an entry of the multiplier factor into the multiplier entry receiving device without decimal value shift, neither MPS, nor MCS will become energized, there being no characteristic extra index point perforation upon the card. However, if there is to be a shift of the MP entry for a hundredths decimal component MPS will be energized. Likewise if there is to be a control for an entry of a multiplier decimal factor of thousandths, there will be a concurrent energization of MPS and MCS to effect a shift of the multiplier entry and of the multiplicand entry. It may be further explained that MCS becomes energized upon brush 23 encountering a perforation and both MPS and MCS will become energized if both brushes 22 and 23 encounter a perforation. It may be further explained that if brush 23 alone encounters an extra perforation, the energization of MCS will effect an energization of MPS. This is effected by closure of contacts MCS—8 (Fig. 4d) which become closed upon the energization of MCS. The contacts MPS—7 constitute stick contacts for MPS when it is energized alone or for MPS or MCS when both are energized. The stick circuit through MPS—7 is maintained during the card reading portion of a card feed cycle, when amounts are being read from the card by the regular brushes 20. Cam contacts CC—6, which maintain the stick circuit, are so timed as to open up after the amount or amounts have been read from the card as will be clear from the timing diagram (Fig. 5). It may be further explained that a following card may re-initiate an energization of MPS and/or MCS and such re-initiated operation may occur irrespective of the former status of MPS or MCS, that is MPS and/or MCS will have become de-energized after they have directed the entry of one card and directly after they have been de-energized they may become re-energized under control of brushes 22 and 23 cooperating with a following card.

*Rate card operation*

Machines of this general class are also sometimes used on so-called rate card operations. With such operations the multiplier is taken from a first card of a group and is retained in the machine for a number of succeeding computations and for following detail cards which bear the multiplicand data. When a new rate card comes along the old multiplier is cleared from the machine and a new multiplier is entered from the following rate card, which new multiplier is used for succeeding detail computations on following multiplicand or detail cards. When the machine is to be used for such rate card operations it will be appreciated that the shifted entry into the multiplier entry receiving device will be retained as long as the multiplier remains set up in the multiplier entry receiving device. It is accordingly possible to have decimal value shift control computations involving a 1/100 decimal factor by placing the special perforation which is encountered by the 22 brush only upon the rate card, but when decimal value shifts pertaining to computations involving a 1/1000 decimal factor are to be effected, the special perforation to be encountered by brush 23 must appear on the detail cards. Under rate card operations each rate card has a so-called X punching in a given column therein in the first or eleventh extra index point position of the card. This X punching is sensed by the extra rate card brush 21 (Fig. 4d). Such brush on encountering such rate card perforation causes energization of the relay coil A. Relay coil A when energized, closes contacts A—3 which establishes a stick circuit through cam contacts FC—3 (Fig. 4d). Relay coil A also shifts relay contacts A—2 and A—1 to reverse position from that shown in Fig. 4a. The shifting of relay contacts A—2 cuts off the return circuit from the 46MC counter magnets, but maintains a return circuit to ground from the 46MP counter magnets. Consequently, the amount of the rate or multiplier may be entered from the rate card, but no entry will be made from this card into the multiplicand counter. Relay contacts A—1 establish a return circuit for the 52MP reset magnet so that the multiplier counter will become reset concurrently with the reset of the multiplicand counter at the end of the run of computations upon a number of detail cards. Such reset will occur prior to the reading in of the multiplier amount from the new rate card. It will be understood that for rate card operations, switch 48 is thrown to open position.

There are further controls provided to eliminate punching on rate card operations or to permit punching, but these need not be described in detail as they form no part of the present invention. Such details are described in the United States application of George F. Daly, Serial No. 643,663, filed November 21, 1932.

The machine is also adaptable for checking operations in which case the entries of the multiplicand and multiplier are relatively reversed. This is effected by shifting the lever 44 to the left to shift the contacts 43, 42 and 42a to reverse position from that shown.

Figure 5A:
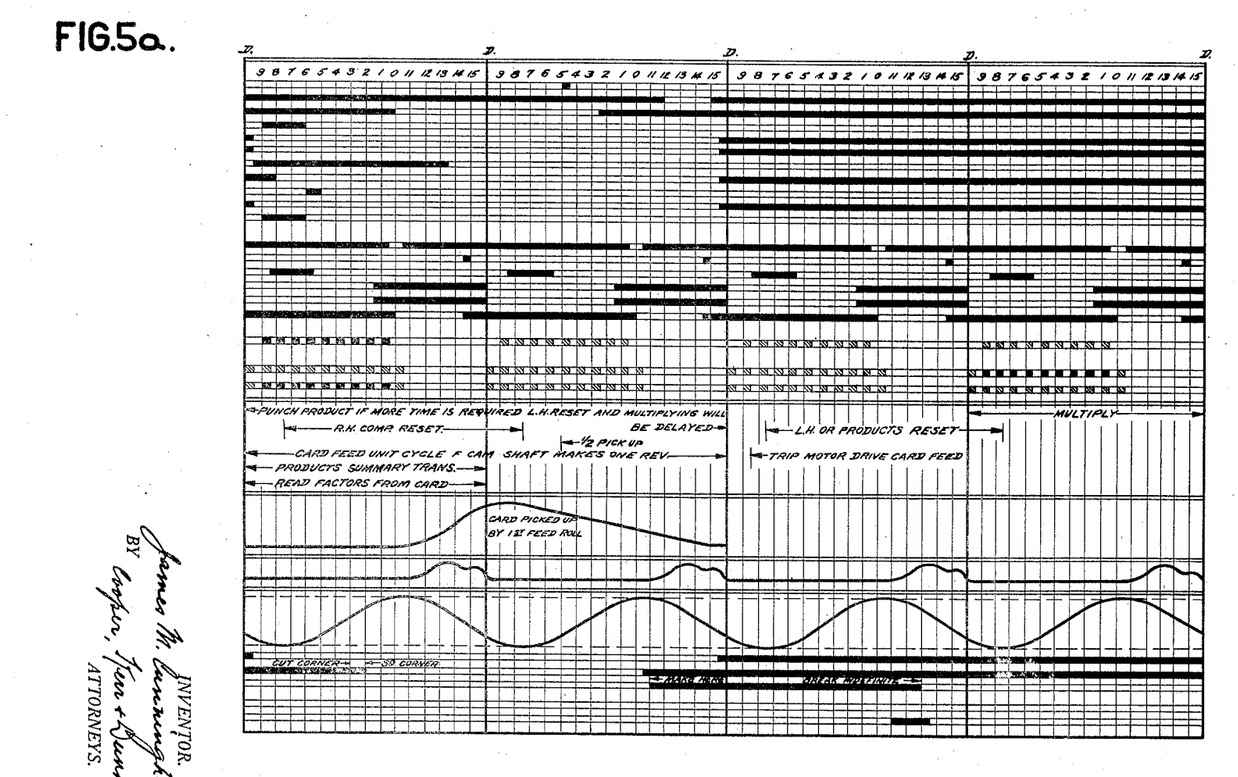

Referring now to the timing diagram (Figs. 5 and 5a) this diagram shows the time in which various operations occur, the time of cam contact closure, etc. The supplemental controls provided by the present invention include the control for the MCS relay and the MPS relay. Such controls are provided for by cam contacts CC—4, CC—5 and CC—6. The time of energization of the related relay coils MPS and/or MCS under the control of one or more extra perforations is shown by the time of operation of cam contacts CC—4 and CC—5. It will be noted that the time of closure of cam contacts CC—6 overlaps this time and furthermore that the time of closure of CC—6 extends over all of the index point positions necessary for reading in an amount from a card upon the following card cycle (see Fig. 5a).

What I claim is:

1. A record controlled multiplying machine for multiplying factor data derived from each of a succession of records in a run, wherein one factor on each record is perforated in the same relative columnar relation irrespective of its true denominational value and wherein variable denominational magnitude characteristics of said factor are designated by special characteristic perforations, factor receiving means, multiplying mechanism controlled thereby including result receiving means which receives calculated results in a denominational relation determined by the denominational relation of entries into the factor receiving means; in combination, means for presensing said special characteristic perforations, factor sensing means, connections between said sensing means and said factor receiving means for normally controlling entry of factor data in the denominational relationship in which the data is sensed, and means controlled by said presensing means for variably setting said connections to change the denominational relationship of entry between said factor sensing means and said factor receiving means whereby the entry of results into said result receiving means during multiplying operations will be effected in a denominational relationship predetermined for each record conjointly by the special characteristic perforation presensing means and the factor sensing means.

2. A machine according to claim 1 wherein two factor receiving means are provided and wherein the means controlled by the presensing means variably sets the connections between the sensing means and the receiving means for both factors in response to special perforations on the records.

3. A machine according to claim 1 wherein two factor receiving means are provided and wherein the means controlled by the presensing means variably sets the connection between the sensing means and either one or both factor receiving means in response to variable special perforations on the records.

4. In a record controlled accounting machine with factor analyzing means for reading factor amounts for two terms of a computation from each of a succession of records, factor receiving means controlled by said reading means, computing mechanism controlled by the factor receiving means including result receiving means which receives results as computed in a denominational relationship determined by the denominational relationship of factor entries into the factor receiving means; including in combination, a presensing control means for detecting special characteristics representative of the denominational magnitude of one of the factor amounts on said factor data containing records, column shift means between the factor receiving means and the factor analyzing means for normally directing the entry of factor data into the factor receiving means in the denominational relationship in which said data is read and for variably changing the entry relations between the analyzing means and receiving means, and means controlled by said presensing control means for selectively variably setting the column shift means according to detected special characteristics on each record, whereby the entry of results during computing operations will be effected in the result receiving means in a denominational relationship predetermined for each record conjointly by the factor reading means and by the presensing means.

JAMES M. CUNNINGHAM.